(12) United States Patent
Tummala et al.

(10) Patent No.: US 10,261,718 B1
(45) Date of Patent: Apr. 16, 2019

(54) ADAPTIVELY CONTROLLING DATA COPY OPERATIONS THAT COPY DATA IN AN ELECTRONIC ENVIRONMENT

(71) Applicant: EMC IP Holding Company LLC, Hopkinton, MA (US)

(72) Inventors: Himabindu Tummala, South Grafton, MA (US); Natasha Gaurav, Hopkinton, MA (US); Santosh PasulaReddy, Westborough, MA (US); Girish Sheelvant, Hopkinton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 65 days.

(21) Appl. No.: 15/193,277

(22) Filed: Jun. 27, 2016

(51) Int. Cl.
*G06F 12/00* (2006.01)
*G06F 3/06* (2006.01)

(52) U.S. Cl.
CPC ............ *G06F 3/065* (2013.01); *G06F 3/0619* (2013.01); *G06F 3/0659* (2013.01); *G06F 3/0683* (2013.01)

(58) Field of Classification Search
CPC ...... G06F 3/065; G06F 3/0619; G06F 3/0659; G06F 3/0683
See application file for complete search history.

(56) References Cited

U.S. PATENT DOCUMENTS

| | | | | |
|---|---|---|---|---|
| 6,738,386 | B1* | 5/2004 | Holmqvist | H04L 47/10 370/412 |
| 7,103,740 | B1* | 9/2006 | Colgrove | G06F 3/0605 707/999.202 |
| 8,838,840 | B1 | 9/2014 | Fair et al. | |
| 9,235,450 | B2 | 1/2016 | Fair et al. | |
| 9,710,308 | B1 | 7/2017 | Schwartz et al. | |
| 9,798,629 | B1 | 10/2017 | Shilane et al. | |
| 2004/0148484 | A1* | 7/2004 | Watanabe | G06F 3/061 711/170 |
| 2007/0180309 | A1* | 8/2007 | Zohar | G06F 11/2058 714/6.12 |
| 2009/0300633 | A1* | 12/2009 | Altrichter | G06F 9/4856 718/103 |

* cited by examiner

*Primary Examiner* — Kalpit Parikh
(74) *Attorney, Agent, or Firm* — BainwoodHuang

(57) ABSTRACT

A technique controls data copy operations that copy data within an electronic environment. The technique involves performing, by processing circuitry, an initial series of data copy operations that copy data from a source location to a target location in accordance with an initial series of data copy triggers. The technique further involves receiving, by the processing circuitry, a set of electronic environment measurements from the electronic environment. The technique further involves making, by the processing circuitry, an adjustment to a next data copy trigger based on the set of electronic environment measurements, the adjustment modifying when a next data copy operation takes place after the initial series of data copy operations, the next data copy operation copying data from the source location to the target location.

22 Claims, 5 Drawing Sheets

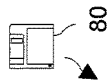
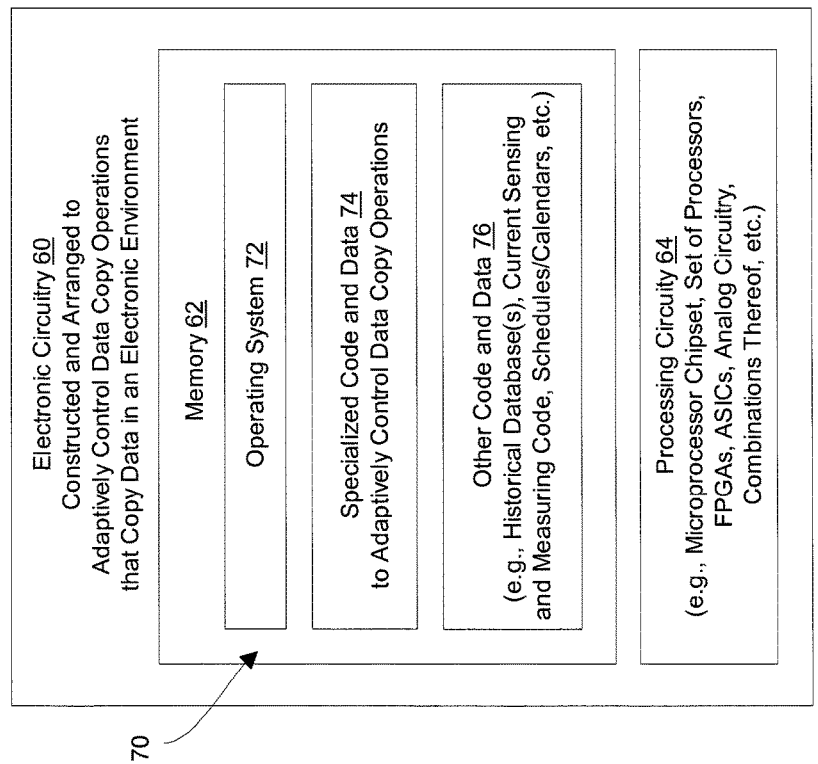
FIG. 2

ADAPTIVELY CONTROLLING DATA COPY OPERATIONS THAT COPY DATA IN AN ELECTRONIC ENVIRONMENT

BACKGROUND

A conventional approach to copying data from one data storage array to another data storage array involves executing a data copy procedure at equal time intervals. For example, suppose that a production data storage array stores data on behalf of a host computer, and that the production data storage array and a replication data storage array are configured to perform asynchronous replication at 10 minute intervals. In such a situation, the production data storage array initiates copying of any new or modified data from the host computer to the replication data storage array every 10 minutes.

In the above-described example, if the production data storage array were to fail, the replication data storage array can operate in place of the failed production data storage array until the production data storage array is repaired. In this situation, it is expected that, at most, only 10 minutes of data from the host computer is lost. That is, it is expected that, in the worst case, only new or modified data that had been received from the host computer within the last 10 minutes has been lost because that data had not yet been copied from the production data storage array to the replication data storage array.

SUMMARY

Unfortunately, there are deficiencies to the above-described conventional approach to copying data from one data storage array to another at equal time intervals. In particular, in the above-provided example which initiates copying of data every 10 minutes from a production data storage array to a replication data storage array, more than 10 minutes of data may be lost.

Along these lines, the production data storage array may be slow to initiate copying of the data due to resource limitations at the production data storage array (e.g., due to an unexpected large load on the array, due to limited capacity resulting from a partial failure of the storage processing circuitry, due to another scheduled operation such as a local archiving process of a background deduplication process, etc.). Likewise, the replication data storage array may be slow to properly store the data due to similar resource limitations. Furthermore, issues which slow the copying process may exist in the network that connects the two arrays (e.g., high traffic, limited bandwidth, etc.).

In such situations, the data copy procedure may not start on time, may be slow to progress, may take longer to complete, etc. Accordingly, if there is failure, there may be a loss of more than 10 minutes of data. As a result, there may be non-compliance with a service level agreement, more data lost than expected, damage to reputation/goodwill, and so on.

On the other hand, scheduling the data copy operations too soon, e.g., every eight minutes instead of every 10 minutes has drawbacks as well. Along these lines, there will be unnecessary excess consumption of resources that could be used for other work purposes such as snapshots, deduplication, and so on. Accordingly, when this other work is performed, this other work will then experience unnecessary delays.

In contrast to the above-described conventional approach to copying data from one array to another at equal time intervals, improved techniques are directed to adaptively controlling data copy operations that copy data within an electronic environment. Such adaptive control may take into account prior information (e.g., operating statistics that are collected over time), current information (e.g., real-time status of data storage equipment and the communications infrastructure), and/or future information (e.g., scheduled events such as upcoming archiving operations, upgrades, etc.). With the improved techniques, suppose that a service level agreement (SLA) imposes a requirement that, at most, only 10 minutes of data is lost; copying of data from one location to another can be initiated smartly at appropriate times (e.g., earlier, later, etc.) to ensure that not more than 10 minutes of data is lost. Accordingly, control over data copy operations is able to dynamically adapt to changes in the electronic environment and data storage operation is able to remain in compliance with the SLA. Such techniques are well suited for a variety of data copy applications such as replication, backups, archiving, migration, mirroring, and so on.

One embodiment is directed to a method of controlling data copy operations that copy data within an electronic environment. The method includes performing, by processing circuitry, an initial series of data copy operations that copy data from a source location to a target location in accordance with an initial series of data copy triggers. The method further includes receiving, by the processing circuitry, a set of electronic environment measurements from the electronic environment. The method further includes making, by the processing circuitry, an adjustment to a next data copy trigger based on the set of electronic environment measurements, the adjustment modifying when a next data copy operation takes place after the initial series of data copy operations, the next data copy operation copying data from the source location to the target location.

In some arrangements, the source location includes first data storage equipment, and the target location includes second data storage equipment. In these arrangements, performing the initial series of data copy operations includes, in response to the initial series of data copy triggers, copying data from the first data storage equipment to the second data storage equipment through a communications medium.

In some arrangements, copying data from the first data storage equipment to the second data storage equipment through the communications medium includes: for each data copy operation of the initial series of data copy operations, (i) creating a copy of original data which currently resides on the first data storage equipment, (ii) conveying the copy of the original data from the first data storage equipment to the second data storage equipment through the communications medium, and (iii) storing the copy of the original data on the second data storage equipment while the original data continues to reside on the first data storage equipment.

In some arrangements, the first data storage equipment and the second data storage equipment form a data storage system which is constructed and arranged to store host data on behalf of a set of host computers. Here, prior to making the adjustment to the next data copy trigger, the set of host computers stores original host data in the first data storage equipment. Additionally, making the adjustment to the next data copy trigger includes scheduling, as the next data copy operation, a time to copy a portion of the original host data from the first data storage equipment to the second data storage equipment through the communications medium while the portion of the original host data remains on the first data storage equipment.

In some arrangements, receiving the set of electronic environment measurements includes collecting, in a historical database, data copy statistics that identify performance of data copy operations which are completed within the electronic environment. In these arrangements, receiving the set of electronic environment measurements further includes accessing the collected data copy statistics from the historical database to analyze prior activity within the electronic environment. Example data copy statistics include measurements of available primary memory at the source and/or target locations, input/output (I/O) loading at particular times of the day at the source and/or target locations, CPU utilization at particular times of the day at the source and/or target locations, average times to write/read data at the source and/or target locations, average amounts of new and modified data received at particular times of the day, prior network behavior, and so on.

In some arrangements, receiving the set of electronic environment measurements includes gathering current operating parameters from the electronic environment, and ascertaining current activity within the electronic environment based on the current operating parameters. Example operating parameters include current memory availability at the source and/or target locations, current I/O loading at the source and/or target locations, current CPU utilization at the source and/or target locations, current I/O latency at the source and/or target locations, whether there are any current background services are in progress at the source and/or target locations such as snapshots, backup processes, archiving, etc., current network traffic, and so on.

In some arrangements, receiving the set of electronic environment measurements includes scheduling, in a calendar database, entries describing future events to take place within the electronic environment, and accessing the entries from the calendar database to project future activity within the electronic environment. Example entries include scheduled snapshots at the source and/or target locations, scheduled backups at the source and/or target locations, scheduled archiving at the source and/or target locations, scheduled maintenance or planned upgrades at the source and/or target locations, and so on.

In some arrangements, the initial series of data copy triggers provides, as an average time between data copy operations, a first amount of time. In these arrangements, making the adjustment to the next data copy trigger includes setting a time between a last data copy trigger of the initial series of data copy triggers and the next data copy trigger to be a second amount of time which is different than the first amount of time.

Another embodiment is directed to electronic circuitry which controls data copy operations that copy data within an electronic environment. The electronic circuitry includes memory, and control circuitry coupled to the memory. The memory stores instructions which, when carried out by the control circuitry, cause the control circuitry to:
(A) perform an initial series of data copy operations that copy data from a source location to a target location in accordance with an initial series of data copy triggers,
(B) receive a set of electronic environment measurements from the electronic environment, and
(C) make an adjustment to a next data copy trigger based on the set of electronic environment measurements, the adjustment modifying when a next data copy operation takes place after the initial series of data copy operations, the next data copy operation copying data from the source location to the target location.

Yet another embodiment is directed to a computer program product having a non-transitory computer readable medium which stores a set of instructions to control data copy operations that copy data within an electronic environment. The set of instructions, when carried out by computerized circuitry, causes the computerized circuitry to perform a method of:
(A) performing an initial series of data copy operations that copy data from a source location to a target location in accordance with an initial series of data copy triggers;
(B) receiving a set of electronic environment measurements from the electronic environment; and
(C) making an adjustment to a next data copy trigger based on the set of electronic environment measurements, the adjustment modifying when a next data copy operation takes place after the initial series of data copy operations, the next data copy operation copying data from the source location to the target location.

It should be understood that, in the cloud context, at least some of the processing circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in adaptively controlling data copy operations that copy data within an electronic environment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 2 is a block diagram of particular electronic circuitry of the electronic data storage environment of FIG. 1.

DETAILED DESCRIPTION

An improved technique is directed to adaptively controlling data copy operations that copy data in an electronic data storage environment. Such adaptive control may take into account historical information (e.g., statistics that are collected over time), real-time information (e.g., the current status of data storage equipment and the communications infrastructure), and/or upcoming event information (e.g., scheduled tasks such as upcoming snapshots, backups, archiving operations, upgrades, etc.). With the improved technique, suppose that a service level agreement (SLA) imposes a requirement that, at most, only 10 minutes of data is lost. In such a situation, copying of data from one location to another can be initiated smartly at specific appropriate times (e.g., sooner or later than initially scheduled) to ensure that not more than 10 minutes of data is lost. Accordingly, control over data copy operations is able to dynamically adapt to changes in the electronic environment. Moreover, data storage operation remains in compliance with the SLA.

Figure 1:
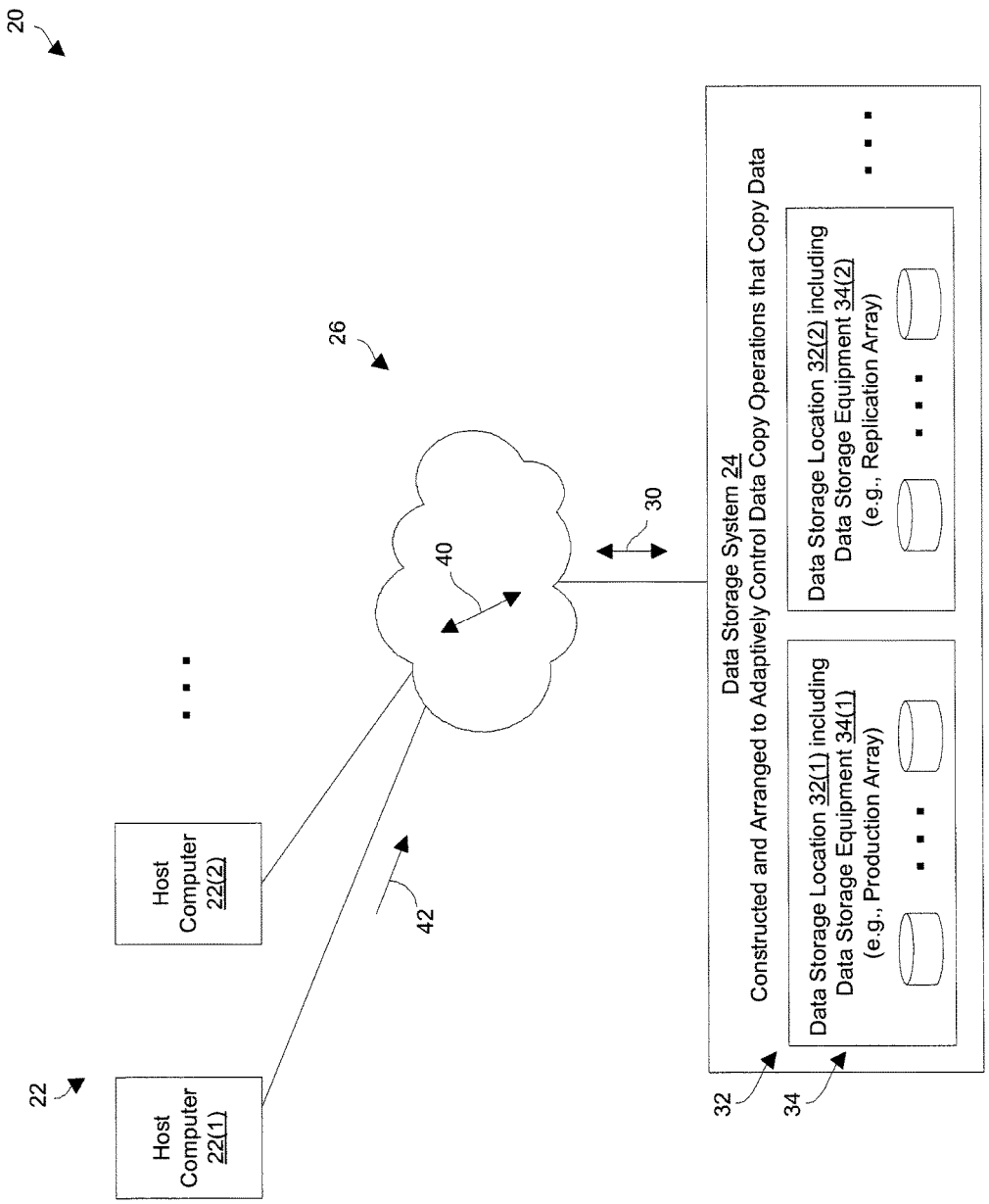
FIG. 1 is a block diagram of an electronic data storage environment in which data copy operations are adaptively controlled.

FIG. 1 shows an electronic data storage environment 20 which adaptively controls data copy operations that copy data between data storage locations. The electronic data storage environment 20 includes host computers 22(1), 22(2), . . . (collectively, host computers 22), a data storage system 24, and a communications medium 26.

Each host computer 22 is constructed and arranged to perform useful work. For example, the host computers 22 may operate as file servers, email servers, database servers, web servers, processing engines, and so on. Accordingly, the host computers 22 read host data 30 from and write host data 30 to the data storage system 24.

The data storage system 24 is constructed and arranged to reliably and robustly manage the host data 30 on behalf of the host computers 22. To this end, the data storage system 24 includes multiple data storage locations 32(1), 32(2), . . . (collectively, data storage locations 32) including data storage equipment 34(1), 34(2), . . . (collectively, data storage equipment 34). Each data storage location 32 performs data storage operations (e.g., load/store operations, snapshots, deduplication, replication, data backups, archiving, etc.). The data storage locations 34 may be adjacent each other (e.g., within the same room, on the same floor, in the same facility, etc.) or remote from each other (e.g., in different buildings, in different campuses, on different coasts, etc.).

The communications medium 26 is constructed and arranged to connect the various components of the electronic data storage environment 20 together to enable these components to exchange electronic signals 40 (e.g., see the double arrow 40). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting SAN-based communications, LAN-based communications, cellular communications, combinations thereof, etc.

During operation, the host computers 22 provide data storage commands 42 (e.g., SCSI requests, file access requests, etc.) to the data storage equipment 24. In response, the data storage system 24 performs data storage operations to access host data 30 (e.g., to read host data 30, to write host data 30, etc.). As part of this process, the data storage system 24 may provide advanced data storage services such as data mirroring, snapshotting, data backups, data archiving, data replication, and so on. Such data storage services may involve copying data.

One should appreciate that, if data copy operations from the location 32(1) to the location 32(2) are rigidly invoked every 10 minutes (e.g., in response to a simple timer) in an attempt to comply with a SLA which requires replication to the location 32(2) every 10 minutes, it is possible that the more than 10 minutes of data could be lost due to a failure of location 32(1). Along these lines, resource contention at the location 32(1) (e.g., a busy period of operation which consumes memory/CPU/bandwidth/etc., a component failure, etc.) may prevent a data copy operation from starting on time. Additionally, there may be existing network traffic or bandwidth limitations between the locations 32(1), 32(2) that prevent a normal amount of data to flow from the location 32(1) to the location 32(2). Furthermore, the location 32(2) may not be appropriately provisioned to receive the data from the location 32(1) as quickly as possible (e.g., due to a recently started backup process, etc.). Accordingly, a large data copy operation (e.g., several gigabytes) may take significantly more time than expected (perhaps on the order of minutes). As a result, the failure of the location 32(1) would cause a loss of more than 10 minutes of data.

However, in contrast to simply invoking a data copy operation every 10 minutes, the data copy operations of the improvement techniques are triggered in an adaptive manner based on historical statistics, real-time status, and/or scheduled events. Accordingly, the data storage system 24 is able to dynamically determine when to trigger each data copy operation individually in order to properly achieve the desired results (e.g., completed data copy operations every 10 minutes). Therefore, if the location 32(1) were to fail, at most only 10 minutes of data would be lost thus complying with the SLA. As a result, the data storage system 24 is able to achieve many goals such as reliable completion of data transfer/movement between locations 32 even when the equipment 34 and the communications medium 26 are encountering different situations.

It should be understood that, in some arrangements, communications between the data storage equipment 34 of the different data storage locations 32 passes through the communications medium 26. For example, in some situations, the amount of traffic between the set of host computers 22 and a first data storage location 32 impacts the performance of data copy operations between the data storage location 32(1) and the data storage location 32(2). Likewise, the amount of traffic between the data storage locations 32(1), 32(2) (e.g., see the data storage commands 42 from the host computers 22 to the data storage system 24) impacts the performance of host I/O operations. Further details will now be provided with reference to FIG. 2.

FIG. 2 shows particular details of electronic circuitry 60 of the data storage system 24 (also see FIG. 1). The electronic circuitry 60 includes memory 62 and processing circuitry 64. This electronic circuitry 60 may reside within the data storage equipment 34 of one or more of the data storage locations 32, or alternatively reside in a dedicated device which is separate from the data storage locations 32.

The memory 62 is intended to represent both volatile storage (e.g., DRAM, SRAM, etc.) and non-volatile storage (e.g., flash memory, magnetic memory, etc.). The memory 62 stores a variety of software constructs 70 including an operating system 72, specialized code and data 74, and other code and data 76. The operating system 72 is intended to refer to core instructions such as a kernel to manage computerized resources (e.g., processor cycles, memory space, etc.), drivers, utilities/tools to measure performance, and so on. The specialized code and data 74 includes instructions that adaptively control data copy operations (e.g., when to move data for snapshots, replication, backups, migration, etc.). The other code and data 76 include instructions and data such as historical performance data, schedules and calendar entries for future events, results of previously performed analyses for moving data, and so on.

The processing circuitry 64 is constructed and arranged to operate in accordance with the various software constructs 70 stored in the memory 62. As will be explained in further detail shortly, the processing circuitry 64 runs in accordance with the specialized code and data 74 to properly execute data copy operations in order to maintain SLA compliance, provide fault tolerance, etc. Such processing circuitry 64 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 80 is capable of delivering all or portions of the software constructs 70 to the electronic circuitry 60. In particular, the computer program product 80 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, flash memory, disk memory, tape memory, and the like.

During operation, the electronic circuitry 60 complies with a set of predefined data copy requirements which are imposed on the data storage system 20. For example, a SLA may require that any new or modified host data 30 at the data storage location 32(1) be replicated to the data storage location 32(2) at least every 10 minutes. To this end, a control circuit is formed by the processing circuitry 64 operating in accordance with the software constructs 70 stored in the memory 62 to properly move data from the data storage location 32(1) to the data storage location 32(2) at the appropriate times. In particular, the control circuit dynamically generates data copy triggers at approximately 10 minute intervals, and executes data copy operations in response to the data copy triggers.

However, these time intervals for the data copy triggers are not set rigidly at exact 10 minute intervals. Rather, the control circuitry smartly adjusts the data copy triggers based on a variety of factors, e.g., prior performance statistics, current data, future scheduled events, etc. Accordingly, the control circuitry is able to dynamically modify when each data copy trigger is issued so that the data storage system 24 as a whole is able to achieve compliance with the SLA.

Example 1 (Dynamic Adjustment Based on Analysis of Collected Statistics)

In a first example situation, suppose that a SLA dictates that the data storage location 32(1) must complete data copy operations to the data storage location 32(2) every 10 minutes as part of an asynchronous replication process (i.e., periodically, changed host data at the replication source is temporarily queued and then copied to the replication target). Additionally, suppose that, under regular operating conditions, the data storage system 24 has determined that issuing a data copy trigger every 9.5 minutes is sufficient to effectuate proper copying of new and modified host data from the data storage location 32(1) to the data storage location 32(2) in satisfaction of the SLA.

However, suppose that the prior performance statistics now indicate that the load on the destination data storage location 32(2) routinely increases on weekdays between 9 AM and 11 AM so that write operations by the data storage location 32(2) take 100 milliseconds longer on average during this time period. As a result, issuing a data copy trigger every 10 minutes may no longer be sufficient to effectuate proper copying of new and modified host data from the data storage location 32(1) to the data storage location 32(2) in satisfaction of the SLA. Rather, the extra load on the destination data storage location 32(2) during this time period would cause additional data loss if a failure occurred before a data copy operation completed.

To address this, the control circuitry may factor in this information and determine that the 10 minute data copy operations for proper replication must now start every nine (9) minutes rather than every 9.5 minutes during this time period. Accordingly, the control circuitry triggers a data copy operation every nine minutes on weekdays during 9 AM and 11 AM to maintain SLA compliance.

Example 2 (Dynamic Adjustment Based on Current Measurements)

In a second example situation, suppose that the SLA again dictates that the data storage location 32(1) must complete data copy operations to the data storage location 32(2) every 10 minutes as part of a replication process. During the last few days, the data storage location 32(1) has had to initiate data copy triggers two minutes earlier than usual (e.g., at eight minute intervals) due to limited bandwidth in the communications medium 26 that connects the data storage location 32(1) to the data storage location 32(2) (e.g., due to atypical delays caused by network servicing).

However, now suppose that current measurements of network bandwidth between the data storage location 32(1) and the data storage location 32(2) indicate that the performance of the communications medium 26 has returned to normal. In response to such a determination (or perhaps after confirming that the situation has returned to normal after a predefined period of time such as one hour or one day), the data storage system 24 dynamically extends triggering of the data copy operation back to a longer time that allows the data storage system 24 to complete the data copy operation in compliance with the SLA (e.g., by starting the data copy operation 9.5 minutes after the last data copy operation).

Accordingly, the data storage equipment 34 is not consuming more resources than necessary. As a result, other metrics (e.g., I/O latency, CPU utilization, memory consumption, etc.), services (e.g., snapshots, deduplication, etc.), and so on are not negatively impacted.

Example 3 (Dynamic Adjustment Based on Scheduled Events)

In a third example situation, suppose that a SLA dictates that the data storage location 32(1) must complete data copy operations to the data storage location 32(2) every 10 minutes as part of a replication process. Additionally, under regular operating conditions, the data storage system 24 has determined that issuing a data copy trigger every 9.75 minutes is sufficient to effectuate proper copying of new and modified host data from the source data storage location 32(1) to the destination data storage location 32(2) in satisfaction of the SLA.

However, suppose that a calendaring tool indicates that a full backup is scheduled to begin at 2 AM and that historically such operation has impacted performance of the data storage location 32(1). To guarantee compliance with the SLA during this timeframe (e.g., starting at 2 AM and until the full backup has been completed), issuing a data copy trigger every 9.75 minutes may not be sufficient to effectuate proper copying of new and modified host data from the data storage location 32(1) to the data storage location 32(2) in satisfaction of the SLA. Rather, the extra load on the source data storage location 32(1) during this time period would cause additional data loss (i.e., of more than 10 minutes of data) if a failure occurred before a data copy operation completed.

To address this, the control circuitry may factor in this information and determine that the 10 minute data copy operations for proper replication must start every 8.75 minutes rather than every 9.75 minutes until the backup process completes. Accordingly, the control circuitry triggers a data copy operation every 8.75 minutes during this timeframe to maintain SLA compliance.

Further Details

Figure 3:
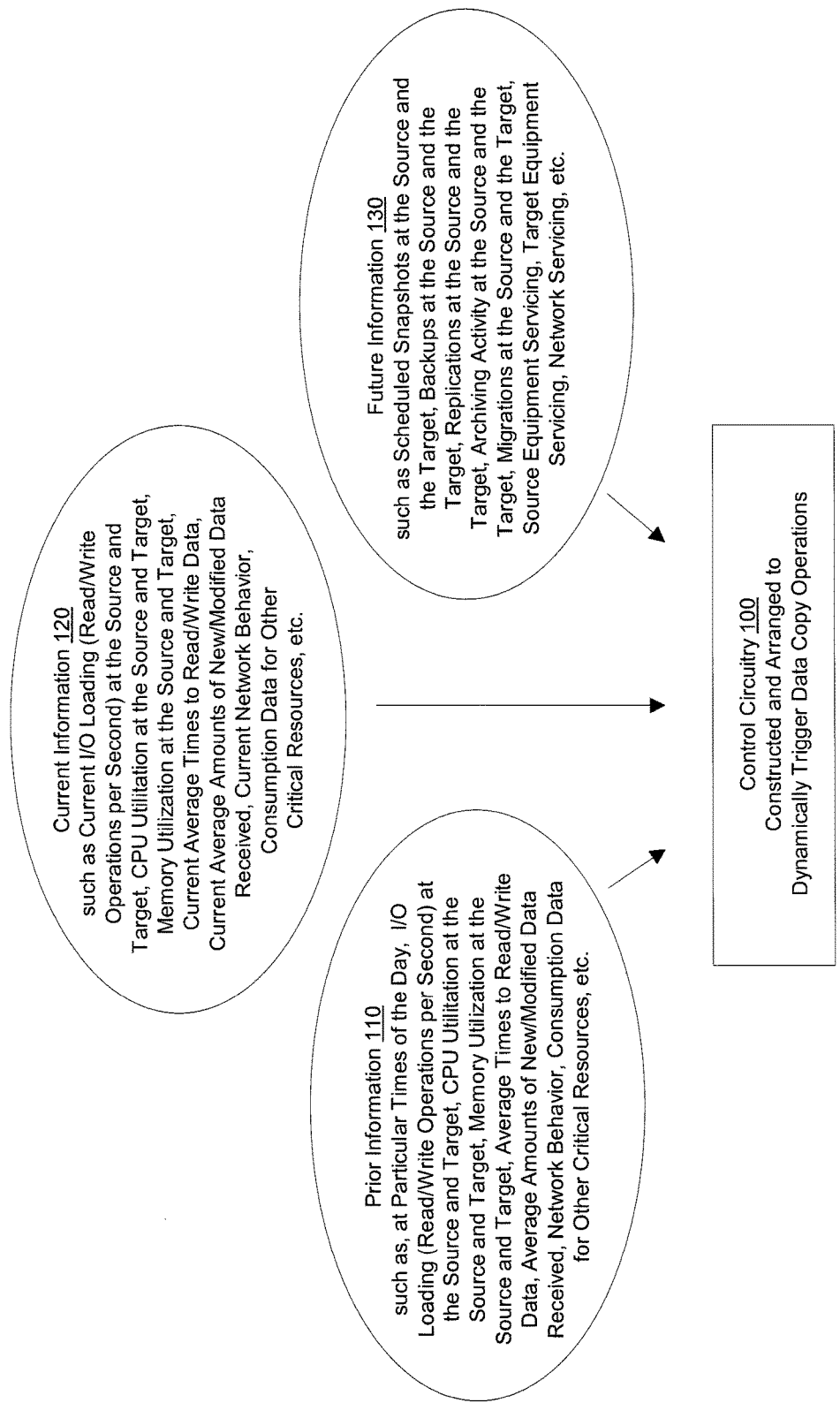
FIG. 3 is a block diagram illustrating example operational details of the electronic data storage environment.

FIG. 3 illustrating the various sources of input to control circuitry 100 which dynamically determines when to trigger data copy operations. Such control circuitry 100 is formed by the processing circuitry 64 operating in accordance with the software constructs 70 stored in the memory 62 (also see FIG. 2). Such control circuitry 100 may be formed by part of one or more data storage arrays or be external to the data storage arrays.

It should be understood that the control circuitry 100 is able to customize when to trigger each data copy operation in compliance with a specific timing objective such as a requirement in a SLA that data (e.g., host data, metadata, overhead/support data, etc.) at the location 32(1) is completely replicated at location 32(2) every 10 minutes so that no more than 10 minutes of data is lost due to a failure at the location 32(1) (also see FIG. 1). Accordingly, the control circuitry 100 is able to complete data copy operations in an adaptive manner to compensate for changes in the electronic environment 20 and satisfy the requirements of the SLA.

As shown in FIG. 3, the control circuitry 100 is capable of using, as sources of input, prior information 110, current information 120, and/or future information 130 (generally referred to as electronic environment measurements) when determining when to perform a data copy operation. In some arrangements, the control circuitry 100 uses multiple sources of input for each data copy operation.

Examples of prior information 110 include statistics collected at the source location 32 such as I/O loading, CPU utilization, memory utilization, average time to complete a read operation, average time to complete a write operation, latency times for host communications, latency times for communications with target locations 32, and so on. Additional examples of prior information 110 include statistics collected at the target location 32 such as I/O loading, CPU utilization, memory utilization, average time to complete a read operation, average time to complete a write operation, latency times for host communications, latency times for communications with source locations 32, and so on. Other examples of prior information 110 include statistics for network bandwidth, network traffic, etc. Such information may be gathered in an ongoing manner, for particular times of the day, for particular days of the week, and so on.

Additionally, examples of current information 120 include real-time measurements at the source location 32 such as I/O loading, CPU utilization, memory utilization, latency times for host communications, latency times for communications with target locations 32, and so on. Further examples of current information 110 include real-time measurements at the target location 32 such as I/O loading, CPU utilization, memory utilization, latency times for host communications, latency times for communications with source locations 32, and so on. Other examples of prior information 110 include current measurements for network bandwidth, network traffic, etc. Such information may be gathered/sensed directly from various equipment, calculated, algorithmically derived, and so on.

Furthermore, examples of future information 130 include scheduled events that would affect data copy operation performance such as scheduled snapshots at the source and/or target, scheduled deduplication tasks at the source and/or target, scheduled backups at the source and/or target, scheduled archiving at the source and/or target, scheduled replication operations at the source and/or target, scheduled migration operations at the source and/or target, scheduled servicing events, and so on. Data from such events may be obtained from electronic calendars, scheduling databases, queues of tasks, and so on.

For example, the control circuitry 100 may take, as input in determining when next to trigger a data copy operation for asynchronous replication, prior information 110, current information 120, and future information 130. Along these lines, based on historical data and current measurements, a worsening in I/O latency (e.g., an increase in read latency at a source location 32 from 10 milliseconds to 11 milliseconds, an increase in write latency to a target location 32, etc.) tends to move the trigger earlier to enable the data copy operation to properly complete on time. Similarly, a worsening of CPU utilization (e.g., from 50% to 60%) tends to move the trigger earlier. Likewise, a worsening of the available network bandwidth tends to move the trigger earlier. Moreover, from a schedule or database, an indication that a full backup task is about to begin will move the trigger earlier.

On the other hand, a reduction in the amount of data that must be copied from the source location 32 to the target location 32 tends to reduce the amount of time needed for the copy operation thus allowing the trigger to start later than normal but still enable the copy operation to complete on time. Similarly, completion of certain background tasks that free up more resources (e.g., completion of a deduplication service, completion of an archiving task, etc.) tends to allow moving the trigger later, and so on. Further details will now be provided with reference to FIG. 4.

Figure 4:
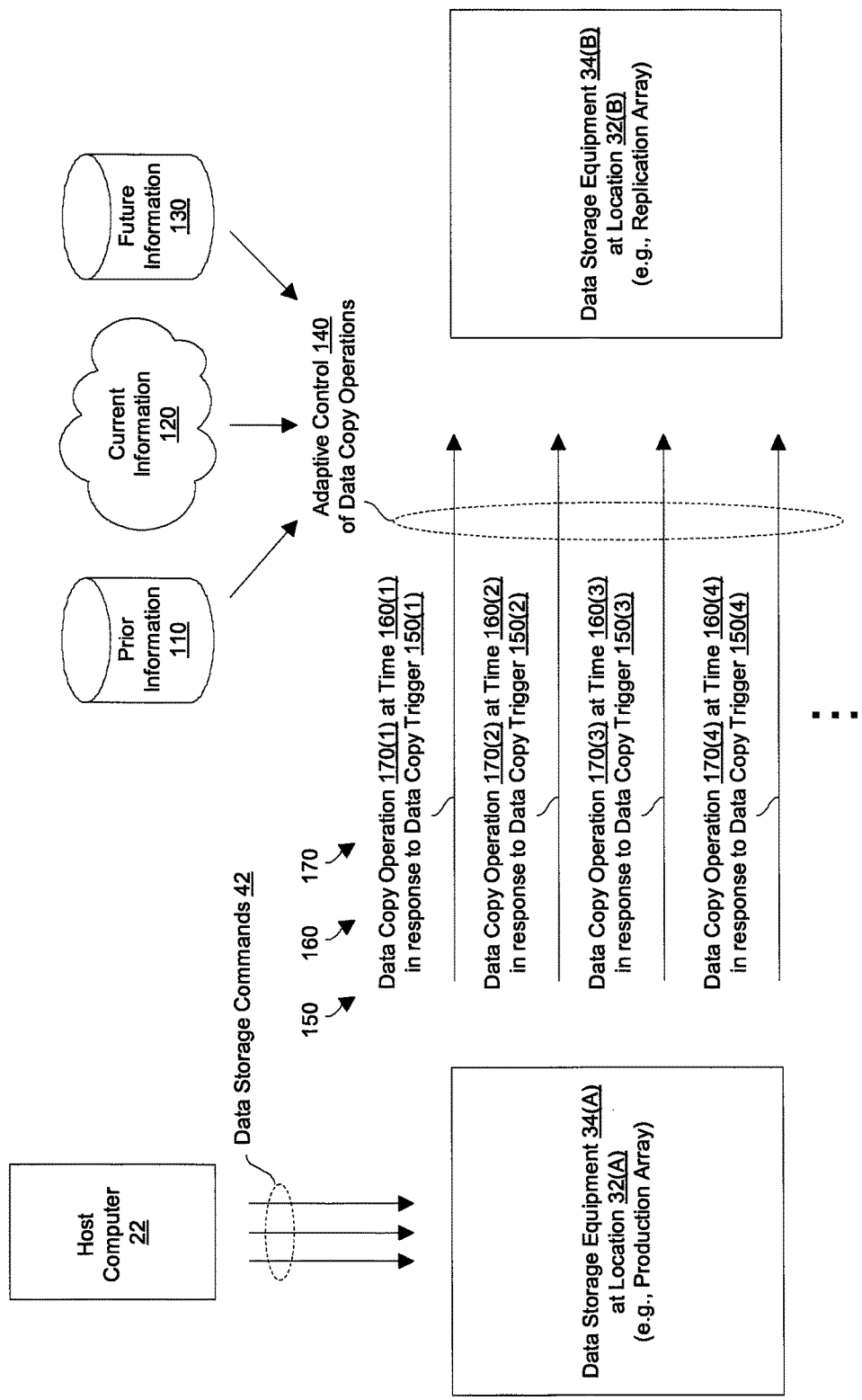
FIG. 4 is a block diagram illustrating further example operational details of the electronic data storage environment.

FIG. 4 illustrates an example situation in which the adaptive control 140 provided by the control circuitry 100 (FIG. 3) manages the timing of data copy operations 150 between data storage equipment 34(A) and data storage equipment 34(B) (e.g., data storage arrays). In this example, a host computer 22 provides data storage commands 42 (e.g., SCSI requests) to the data storage equipment 34(A) to write and read host data. As the host computer 22 provides new data to the data storage equipment 34(A), the data storage equipment 34(A) performs asynchronous replication with the data storage equipment 34(B) in accordance with a SLA that requires the copy of the host data on the data storage equipment 34(B) at location 32(B) to be at most 15 minutes out of sync with the host data on the data storage equipment 34(A) at location 32(A).

As shown in FIG. 4, the adaptive control 140 (also see the control circuitry 100 in FIG. 3) takes, as input, the previously described one or more of the prior information 110, the current information 120, and the future information 130, and issues triggers 150 at times 160 to carry out data copy operations 170. Along these lines, the adaptive control 140 provides a trigger 150(1) at time 160(1) to perform data copy operation 170(1), a trigger 150(2) at time 160(2) to perform data copy operation 170(2), a trigger 150(3) at time 160(3)

to perform data copy operation 170(3), a trigger 150(4) at time 160(4) to perform data copy operation 170(4), and so on.

It should be understood that the time difference between each time 160 may vary due to the control circuitry's analysis of the prior information 110, current information 120, and future information 130. In some arrangements, the various factors are input into a set of algorithmic operations that numerically determine particular trigger times 160. Along these lines, some factors may take the form of numerical values/input (e.g., numerical measurements of I/O loading, CPU utilization, etc.). Other factors may take the form of binary values/input such as backup currently underway or backup currently not underway, deduplication underway or deduplication not underway, and so on.

Ultimately, the control circuitry 100 identifies an amount of time needed to complete the next data copy operation. The adaptive control 140 then provides the next data copy trigger 150 at the appropriate time 160 so that the next data copy operation 170 complete on time (e.g., in compliance with the SLA).

Suitable ways for evaluation are as follows:

Criteria: $(1/n\Sigma_{i=1}^{n}RL, 1/n\Sigma_{i=1}^{n}WL, CPU, Mem, BW)$ $$\text{Criteria:} \left( \frac{1}{n}\sum_{i=1}^{n} RL, \frac{1}{n}\sum_{i=1}^{n} WL, CPU, Mem, BW \right)$$

$$\text{Formula} = \frac{\frac{1}{n}\sum_{i=1}^{n} RL}{\frac{1}{n}\sum_{i=1}^{n} WL} * CPU\% * Mem\%$$

where:
Read Latency=RL
Write latency=WL
CPU Utilization=CPU
Other Services=OTS (Memory, Resources, Services like Analytics); this will directly affect CPU and Mem
Bandwidth=BW
Memory=Mem utilization Moreover, some further general use cases include:
RL<WL, while the other factors are constant: Limit the data transfer from A to B. To sync up data frequently from source to target, BW will have to lower throttle.
RL>WL, while the other factors are constant: Increase the data transfer from A to B. This will allow frequent sync ups. If the BW is throttled, the bandwidth could be utilized for other services.
Increased CPU utilization due to other factors like compression/deduplication or other services
Since the basis is historical data, data traffic patterns can also be taken as one of the criteria. Examples, if during off hours (12 a-5 a) the IO traffic is less, compute the rule and according schedule the throttle. This approach will allow streamlining data bursts.

Figure 5:
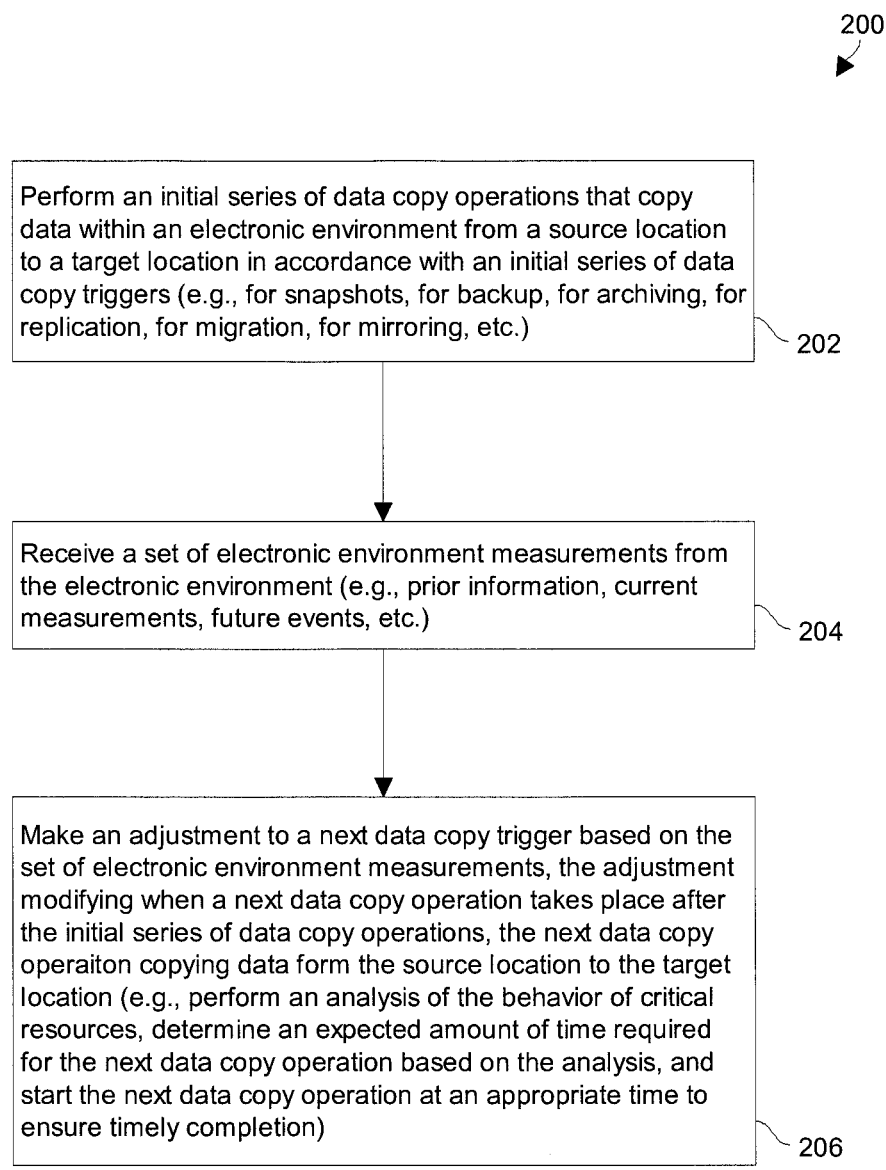
FIG. 5 is a flowchart of a procedure which is performed by the data storage circuitry of FIG. 2.

Further details will now be provided with reference to FIG. 5.

FIG. 5 is a flowchart of a procedure 200 which is performed by the control circuitry 100 (also see FIG. 3) when controlling data copy operations to copy data with an electronic environment. As mentioned earlier, such control is dynamic and adaptive to changes in the electronic environment so the time between each data copy operation may be different.

At 202, the control circuitry 100 performs an initial series of data copy operations that copy data from a source location to a target location in accordance with an initial series of data copy triggers. Such data copy operations may be part of a routine service that is provided concurrently while host computers provide new and modified data, such as a snapshot service, a backup service, an archiving service, a replication service, migration, mirroring, etc. The source location may include local data storage equipment such as a first data storage array, and the target location may include remote data storage equipment such as a second data storage array.

At 204, the control circuitry 100 receives a set of electronic environment measurements from the electronic environment. Such electronic measurements may include prior information (historical), current information (real-time), and/or scheduled events (regarding the future).

At 206, the control circuitry 100 makes an adjustment to a next data copy trigger based on the set of electronic environment measurements. The adjustment modifies when a next data copy operation takes place after the initial series of data copy operations. The next data copy operation copies data from the source location to the target location while the original data is able to remain at the source location.

In some arrangements, the control circuitry 100 (FIG. 3) performs an analysis of the behavior of various critical resources (e.g., I/O loading, CPU utilization, available network bandwidth, the presence or absence of competing processes, etc.). The control circuitry 100 then determines an expected amount of time needed to complete the next copy operation under these conditions, and provides the trigger to start the next copy operation at a time appropriate to finish that operation in accordance with the set of requirements (e.g., the SLA).

For example, rather than initiate the next copy operation after 9.5 minutes since the last copy operation, the control circuitry 100 might initiate the next copy operation after 9.1 minutes to accommodate a larger system load. Such modification enables the data copy operation to properly satisfy a set of imposed requirements (e.g., imposed by a SLA).

As described above, improved techniques are directed to adaptively controlling data copy operations that copy data within an electronic environment 20. Such adaptive control may take into account prior information (e.g., operating statistics that are collected over time), current information (e.g., real-time status of data storage equipment and the communications infrastructure), and/or future information (e.g., scheduled events such as upcoming archiving operations, upgrades, etc.). With the improved techniques, suppose that a service level agreement (SLA) imposes a requirement that, at most, only 10 minutes of data is lost; copying of data from one location to another can be initiated smartly at appropriate times (e.g., earlier or later) to ensure that not more than 10 minutes of data is lost. Accordingly, control over data copy operations is able to dynamically adapt to changes in the electronic environment 20 and data storage operation are able to remain in compliance with the SLA. Such techniques are well suited for a variety of data copy applications such as snapshots, backups, replication, archiving, migration, mirroring, and so on.

One should appreciate that the above-described techniques do not merely copy data. Rather, the disclosed techniques involve improving data movement technology by dynamically setting proper times to initiate data copy operations in order to complete them on time (e.g., in accordance with a SLA). With these improved techniques, other advantages are available as well such as accommodating negative situations in the electronic environment (e.g., high loads, scheduled events, unexpected failures, etc.), positive situations in the electronic environment (e.g., an unexpected drop in network traffic, completion of a resource intensive background task, etc.), and so on. Furthermore, the data copy operations are not triggered too soon in a manner that excessively wastes resources and unnecessarily hinders other tasks which compete for the same resources (e.g., deduplication tasks, data recovery tasks, etc.).

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that replication was described above by way of example only as the purpose for the dynamically triggered data copy operations. The disclosed adaptive data copying improvements are suitable for use in other applications as well such as for determining when to copy data for taking snapshots of data, for creating backups, for archiving data, for data migration, and the like.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document. Such modifications and enhancements are intended to belong to various embodiments of the disclosure.

What is claimed is:

1. A method of controlling data copy operations that copy data within an electronic environment, the method comprising:
  performing, by processing circuitry, an initial series of data copy operations that copy data from a source location to a target location in accordance with an initial series of data copy triggers;
  receiving, by the processing circuitry, a set of electronic environment measurements from the electronic environment; and
  making, by the processing circuitry, an adjustment to a next data copy trigger based on the set of electronic environment measurements, the adjustment modifying when a next data copy operation takes place after the initial series of data copy operations, the next data copy operation copying data from the source location to the target location;
  wherein the source location includes first data storage equipment;
  wherein the target location includes second data storage equipment;
  wherein performing the initial series of data copy operations includes:
    in response to the initial series of data copy triggers, copying data from the first data storage equipment to the second data storage equipment through a communications medium; and
  wherein receiving the set of electronic environment measurements includes:
    scheduling, in a calendar database, entries describing future events to take place within the electronic environment, and
    accessing the entries from the calendar database to project future activity within the electronic environment.

2. A method as in claim 1 wherein copying data from the first data storage equipment to the second data storage equipment through the communications medium includes:
  for each data copy operation of the initial series of data copy operations, (i) creating a copy of original data which currently resides on the first data storage equipment, (ii) conveying the copy of the original data from the first data storage equipment to the second data storage equipment through the communications medium, and (iii) storing the copy of the original data on the second data storage equipment while the original data continues to reside on the first data storage equipment.

3. A method as in claim 1 wherein the first data storage equipment and the second data storage equipment form a data storage system which is constructed and arranged to store host data on behalf of a set of host computers;
  wherein, prior to making the adjustment to the next data copy trigger, the set of host computers stores original host data in the first data storage equipment; and
  wherein making the adjustment to the next data copy trigger includes scheduling, as the next data copy operation, a time to copy a portion of the original host data from the first data storage equipment to the second data storage equipment through the communications medium while the portion of the original host data remains on the first data storage equipment.

4. A method as in claim 1 wherein receiving the set of electronic environment measurements further includes:
  collecting, in a historical database, data copy statistics that identify performance of data copy operations which are completed within the electronic environment, and
  accessing the collected data copy statistics from the historical database to analyze prior activity within the electronic environment.

5. A method as in claim 4 wherein accessing the collected data copy statistics from the database to analyze prior activity within the electronic environment includes:
  identifying prior behavior of critical resources of the first data storage equipment which are to be used during the next data copy operation.

6. A method as in claim 4 wherein accessing the collected data copy statistics from the database to analyze prior activity within the electronic environment includes:

identifying prior behavior of critical resources of the second data storage equipment which are to be used during the next data copy operation.

7. A method as in claim 4 wherein accessing the collected data copy statistics from the database to analyze prior activity within the electronic environment includes:
identifying prior behavior of critical resources of the communication medium which are to be used during the next data copy operation.

8. A method as in claim 1 wherein receiving the set of electronic environment measurements further includes:
gathering current operating parameters from the electronic environment, and
ascertaining current activity within the electronic environment based on the current operating parameters.

9. A method as in claim 8 wherein ascertaining the current activity within the electronic environment based on the current operating parameters includes:
identifying current behavior of critical resources of the first data storage equipment which are to be used during the next data copy operation.

10. A method as in claim 8 wherein ascertaining the current activity within the electronic environment based on the current operating parameters includes:
identifying current behavior of critical resources of the second data storage equipment which are to be used during the next data copy operation.

11. A method as in claim 8 wherein ascertaining the current activity within the electronic environment based on the current operating parameters includes:
identifying current behavior of critical resources of the communication medium which are to be used during the next data copy operation.

12. A method as in claim 1 wherein accessing the entries from the calendar database to project future activity within the electronic environment includes:
identifying future behavior of critical resources of the first data storage equipment which are to be used during the next data copy operation.

13. A method as in claim 1 wherein accessing the entries from the calendar database to project future activity within the electronic environment includes:
identifying future behavior of critical resources of the second data storage equipment which are to be used during the next data copy operation.

14. A method as in claim 1 wherein accessing the entries from the calendar database to project future activity within the electronic environment includes:
identifying future behavior of critical resources of the communication medium which are to be used during the next data copy operation.

15. A method as in claim 1 wherein receiving the set of electronic environment measurements further includes:
collecting, in a historical database, data copy statistics that identify performance of data copy operations which are completed within the electronic environment, and accessing the collected data copy statistics from the historical database to analyze prior activity within the electronic environment, and
gathering current operating parameters from the electronic environment, and ascertaining current activity within the electronic environment based on the current operating parameters; and
wherein the adjustment modifying when the next data copy operation takes place is based on (i) the analyzed prior activity within the electronic environment, (ii) the ascertained current activity within the electronic environment, and (iii) the projected future activity within the electronic environment.

16. A method as in claim 15 wherein the initial series of data copy triggers provides, as an average time between data copy operations, a first amount of time; and wherein making the adjustment to the next data copy trigger includes:
setting a time between a last data copy trigger of the initial series of data copy triggers and the next data copy trigger to be a second amount of time which is different than the first amount of time.

17. A method as in claim 1 wherein the method further comprises:
prior to making the adjustment to the next data copy trigger based on the set of electronic environment measurements, (i) receiving particular data from a set of applications, (ii) storing the particular data within the first data storage equipment, and (iii) acknowledging completion of the set of write operations to the set of host applications;
wherein the next data copy trigger is originally scheduled to initiate the next data copy operation to copy the particular data from the first data storage equipment to the second data storage equipment at a particular time; and
wherein making the adjustment to the next data copy trigger includes:
after acknowledging completion of the set of write operations to the set of host applications, modifying the next data copy trigger to initiate the next data copy operation at a new time that is different from the particular time.

18. A method as in claim 17 wherein the calendar database is a calendaring tool that is separate from cache memory of the first data storage system, the cache memory caching host data on behalf of the set of host applications; and
wherein modifying the next data copy trigger includes:
based on a set of previously-scheduled activities specified by calendaring tool, changing the particular time to the new time to avoid interference from the set of previously-scheduled activities when copying the particular data from the first data storage equipment to the second data storage equipment.

19. A method as in claim 1, further comprising:
operating the second data storage equipment of the target location in place of the first data storage equipment of the source location in response to a failure of the first data storage equipment of the source location.

20. A method as in claim 19 wherein operating the second data storage equipment of the target location in place of the first data storage equipment of the source location includes:
processing, by the second data storage equipment, host write operations that write host data to the second data storage equipment from a set of host computers and host read operations that read host data from the second data storage equipment to the set of host computers.

21. Electronic circuitry which controls data copy operations that copy data within an electronic environment, comprising:
memory; and
control circuitry coupled to the memory, the memory storing instructions which, when carried out by the control circuitry, cause the control circuitry to:
perform an initial series of data copy operations that copy data from a source location to a target location in accordance with an initial series of data copy triggers, receive a set of electronic environment measurements from the electronic environment, and make an adjustment to a next data copy trigger based on the set of electronic environment measurements, the adjustment modifying when a next data copy operation takes place after the initial series of data copy operations, the next data copy operation copying data from the source location to the target location;

wherein the source location includes first data storage equipment;

wherein the target location includes second data storage equipment;

wherein the control circuitry, when performing the initial series of data copy operations, is constructed and arranged to:

in response to the initial series of data copy triggers, copy data from the first data storage equipment to the second data storage equipment through a communications medium; and wherein the control circuitry, when receiving the set of electronic environment measurements, is constructed and arranged to:

schedule, in a calendar database, entries describing future events to take place within the electronic environment, and access the entries from the calendar database to project future activity within the electronic environment.

22. A computer program product having a non-transitory computer readable medium which stores a set of instructions to control data copy operations that copy data within an electronic environment; the set of instructions, when carried out by computerized circuitry, causing the computerized circuitry to perform a method of:

performing an initial series of data copy operations that copy data from a source location to a target location in accordance with an initial series of data copy triggers;

receiving a set of electronic environment measurements from the electronic environment; and making an adjustment to a next data copy trigger based on the set of electronic environment measurements, the adjustment modifying when a next data copy operation takes place after the initial series of data copy operations, the next data copy operation copying data from the source location to the target location;

wherein the source location includes first data storage equipment;

wherein the target location includes second data storage equipment;

wherein performing the initial series of data copy operations includes:

in response to the initial series of data copy triggers, copying data from the first data storage equipment to the second data storage equipment through a communications medium; and wherein receiving the set of electronic environment measurements includes:

scheduling, in a calendar database, entries describing future events to take place within the electronic environment, and accessing the entries from the calendar database to project future activity within the electronic environment.

* * * * *